United States Patent
Horsak et al.

(10) Patent No.: US 6,169,335 B1
(45) Date of Patent: Jan. 2, 2001

(54) CURRENT CONTROL PROCESS

(75) Inventors: Günther Horsak, Meckenbeuren; Hans-Jürgen Ege, Ravensburg, both of (DE)

(73) Assignee: ZF Friedrichshafen AG, Friedrichshafen (DE)

( * ) Notice: Under 35 U.S.C. 154(b), the term of this patent shall be extended for 0 days.

(21) Appl. No.: 09/171,260

(22) PCT Filed: Apr. 10, 1997

(86) PCT No.: PCT/EP97/01778

§ 371 Date: Oct. 15, 1998

§ 102(e) Date: Oct. 15, 1998

(87) PCT Pub. No.: WO97/39388

PCT Pub. Date: Oct. 23, 1997

(30) Foreign Application Priority Data

Apr. 16, 1996 (DE) ............................................. 196 14 866

(51) Int. Cl.⁷ ...................................................... H03L 5/00
(52) U.S. Cl. .......................... 307/10.1; 327/108; 327/110
(58) Field of Search .................................. 307/10.1, 131; 327/108, 110; 361/152, 93

(56) References Cited

U.S. PATENT DOCUMENTS

| | | | |
|---|---|---|---|
| 5,038,247 | * 8/1991 | Kelley et al. | 361/152 |
| 5,166,543 | * 11/1992 | Schneider et al. | 327/110 |
| 5,406,150 | * 4/1995 | Austin | 327/110 |
| 5,757,214 | * 5/1998 | Stoddard et al. | 327/110 |
| 5,763,963 | * 6/1998 | Zydek et al. | 327/110 |

* cited by examiner

*Primary Examiner*—Albert W. Paladini
(74) *Attorney, Agent, or Firm*—Davis and Bujold

(57) ABSTRACT

For current control of an inductive load (4), preferably an electromagnetic pressure regulator, a process is proposed in which an actual current value is detected synchronously and with a delay in relation to the output signal of a current regulator (2). Hereby is prevented the detection of transients superimposed on the actual current value.

6 Claims, 4 Drawing Sheets

CURRENT CONTROL PROCESS

The invention relates to a current control process for an inductive load, particularly an electrohydraulic pressure regulator in an automatic transmission.

BACKGROUND OF THE INVENTION

In automatic transmissions, an electronic control device controls the course and pressure level in the clutches and brakes using electromagnetic pressure regulators. Precise information about the real pressure level or the adjusted current value is very important insofar as it directly affects shifting smoothness and the orderly operation of the automatic transmission. In connection with this, DE-OS 40 34 081 discloses a current regulator switch for an inductive load. The current flowing through the inductive load is measured by a precision resistor. This current actual value and a current reference value are passed to a comparator. The error is thus the output value of the comparator. A regulator connected downstream from the comparator controls a timed performance final stage so that the inductive load is ultimately controlled with a PWM signal.

Another variant of a current control method consists in converting the current actual value detected by means of a precision resistor via an A/D converter. The reference/actual values are compared and the correction variable controlled by means of a program. Since the load is controlled via a clocked final stage with a PWM signal, there occurs at each switch flank a superimposition of interferences (transients) on the current actual value. Thus there exists the possibility that the measured value may be a transient instead of the real current actual value. The prior art described thus has the disadvantage that a misinterpretation of the current actual value is possible.

Consequently, the problem to be solved by the invention is to ensure perfect measuring and control of the current.

SUMMARY OF THE INVENTION

According to the invention, the problem is solved by synchronizing a measuring moment, via an inquiry cycle of an A/D converter, delayed by a presettable time in relation to the cycle of the output signal of the regulator. The advantage here is that the solution, according to the invention, can be integrated in an already existing program without great additional expense. As an added advantage, an increased regulation dynamic results because a software filter such as a sliding mean value formation for stabilizing the transients can be eliminated. Software filters are known to cause the evaluation process to slow down and to cause heavy loading on the computer.

In a further development, it is proposed that in case of considerably great changes in the current reference value a pilot control second signal, together with the output signal delivered by the regulator, acts upon the load. The second signal can be generated by means of a pilot control block. This development offers the advantage known per se of a pilot control. A pilot control is known to have a high dynamic, since in case of considerably great changes only the least ten percent, for example, are compensated by the regulator.

BRIEF DESCRIPTION OF THE DRAWING(S)

The invention is shown with reference to an embodiment shown in the figures in which.

DESCRIPTION OF THE PREFERRED EMBODIMENT(S)

Figure 1:
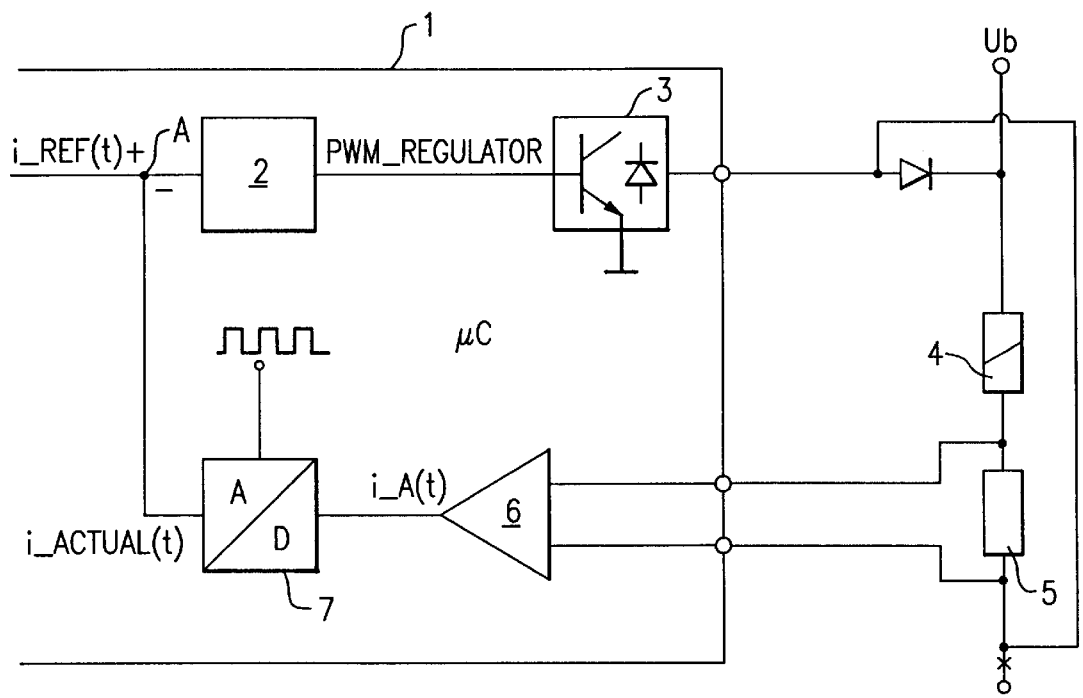
FIG. 1 is a closed loop control.

In FIG. 1 a closed loop control is shown and consists of a regulator 2, and a controlled system, here an electromagnetic pressure regulator 4, an actual value detection path 5, 6 and 7, and a summation point A. A command variable or reference input is a current reference value i_Ref(t). The regulating variable is generally close in value to the actual value i_Ref(t). The regulator 2, a final stage 3, a comparator 6 and an A/D converter 7 are components of an electronic control device or microcontroller 1. The regulator 2 delivers to the final stage 3 a PWM signal, the keying ratio of which represents a current value. The final stage is fed by a supply voltage Ub, for example, 12 V. The electromagnetic pressure regulator 4 is energized by the PWM signal. The current value that actually appears is detected by the comparator 6 by means of a precision resistor 5. Variable output of the comparator 6 is a voltage signal corresponding to the current value i_A(t). The voltage signal is the input variable for the A/D converter 7, which has the same clock frequency as the regulator 2. The output frequency of the regulator 2 and the inquiry frequency of the A/D converter 7 are synchronized in relation to each other. The output variable of the A/D converter 7 is the current actual value i_act(t). The latter is summed on the summation point A with the current reference value i_Ref(t). The difference resulting therefrom is a variable input of the regulator 2.

Figure 2:
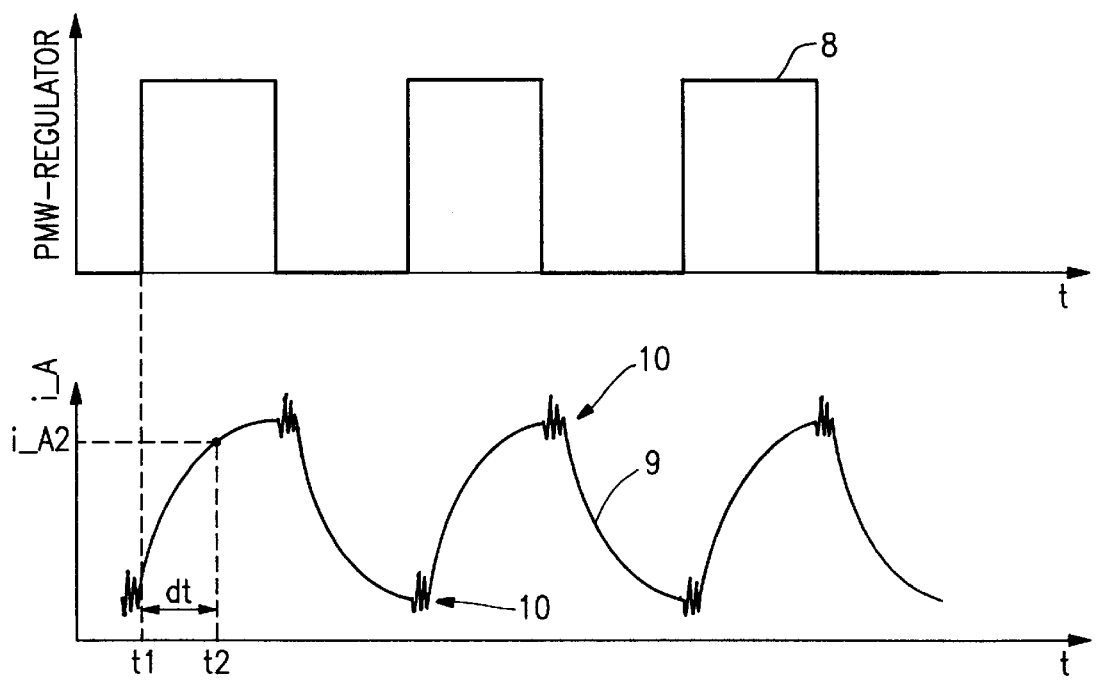
FIG. 2 is a signal course with superimposed transients.

The upper half of FIG. 2 shows the PWM signal 8 issued by the regulator 2 in the course of time. In the lower half the unfiltered current measuring signal i_A(t) 9 is shown. As result of the unideal switching behavior of the final stage 3 combined with the inductive load 4, the current measuring signal i_A(t) is superimposed with transients 10 on each ascending or descending flank. In the traditional current measuring method, the following problem now appears: if the clocked frequency of the regulator 2 and the inquiry frequency of the A/D converter 7 are asynchronous, cycle and inquiry moments can temporarily lie adjacent each other or coincide. If, for example, at a moment t1, corresponding to the ascending flank of the PWM signal, a measured value is detected by the A/D converter 7, the transient 10 is necessarily evaluated. In this case, this leads to an incorrect current actual value. The solution, according to the invention, now consists in the measured value detection of the A/D converter 7 taking place at the moment t2. In other words, the signal detection of the A/D converter 7 is offset and synchronized by a presettable time dt relative to the ascending flank of the PWM signal. It is hereby ensured that a signal free of disturbance will be detected at a defined moment.

Figure 3:
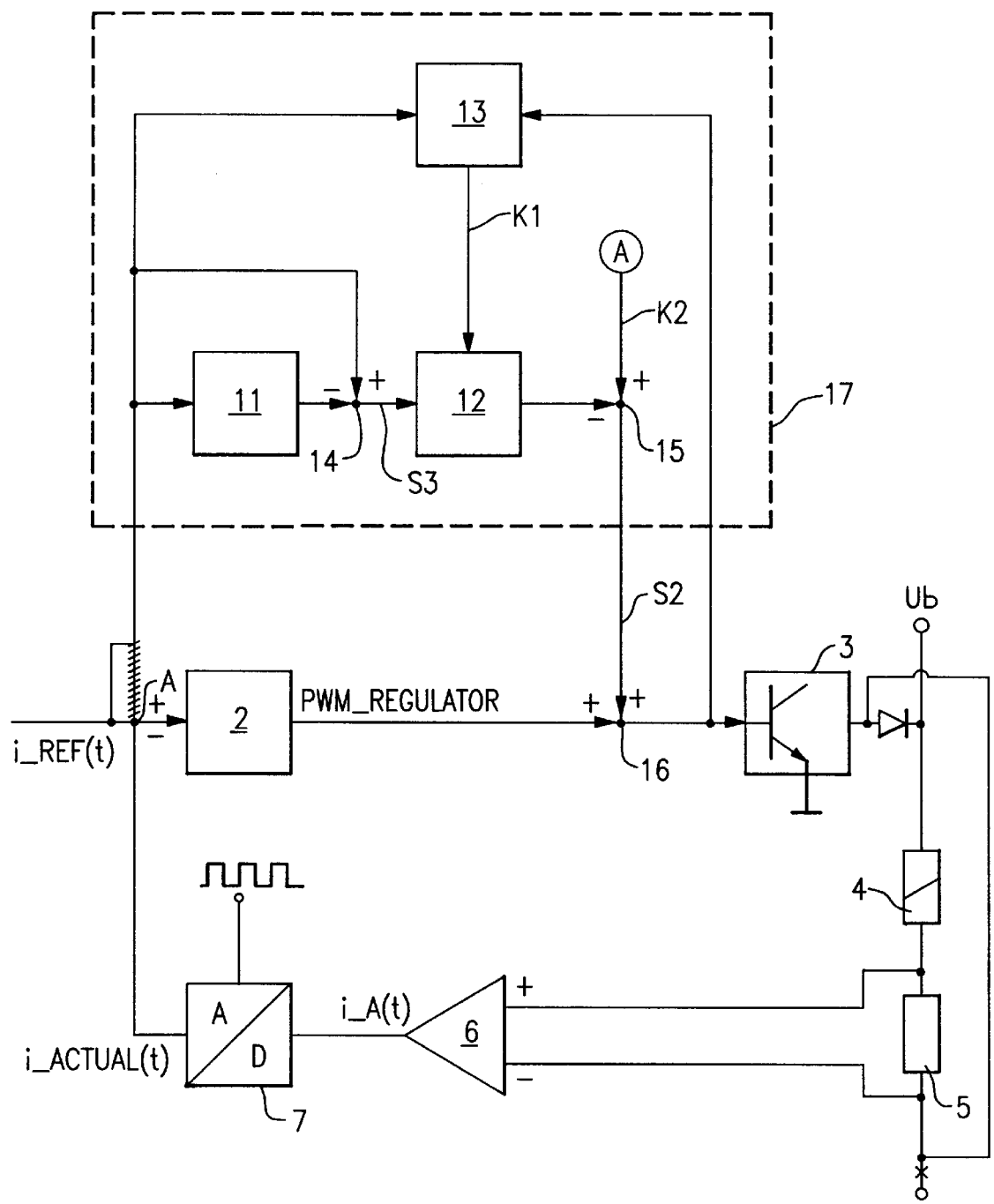
FIG. 3 is a closed loop control with pilot control.

FIG. 3 shows a closed loop control with additional pilot control. The closed loop is identical with the closed loop described in FIG. 1. The pilot control or the pilot control block 17 consists of the following parts: memory 11, a first function block 12, and a second function block 13. Input variables of the pilot control block are a current i_control, and the output signal of the regulator 2, PWM_regulator. From the two input variables, the correction factor K1 is generated in the second function block 13. In the correction factor K1 it is also taken into account, for example, that the ohmic resistance of the electromagnetic pressure regulator 4 is temperature dependent. The input of the function block 12 is the first correction factor K1 and the difference from the present current control value i_act(t) and the previous current control value i_act(t−1). The difference is seen at a summation point 14. The previous current control value i_Control(t−1) is deposited in the memory 11. The output of the function block 12 is thus the change of the current control value cleared with the first correction factor K1. This output is passed to a summation point 15. On the summation point 15, it is cleared with a second correction factor K2. In the correction factor K2 fluctuations in the supply voltage Ub and the interaction of several pressure regulators lying in parallel are taken into account. These electromagnetic pressure regulators arranged in parallel are not shown in FIGS. 1 and 3. An output variable S2 generated from the pilot control block 17 is passed to the summation point 16 so that an addition of the output signal of the regulator 2, PWM_regulator, and the pilot control signal S2 takes place. This is passed to the final stage 3. The operation of the arrangement is as follows: in case of a considerably great change of the current reference value, for example, from 100 mA to 600 mA, a current, for example, of 550 mA is immediately imposed on the final stage 3 by the pilot control block 17. The regulator 2 levels the difference between 550 mA and 600 mA. A high dynamic is thereby achieved.

Figure 4:
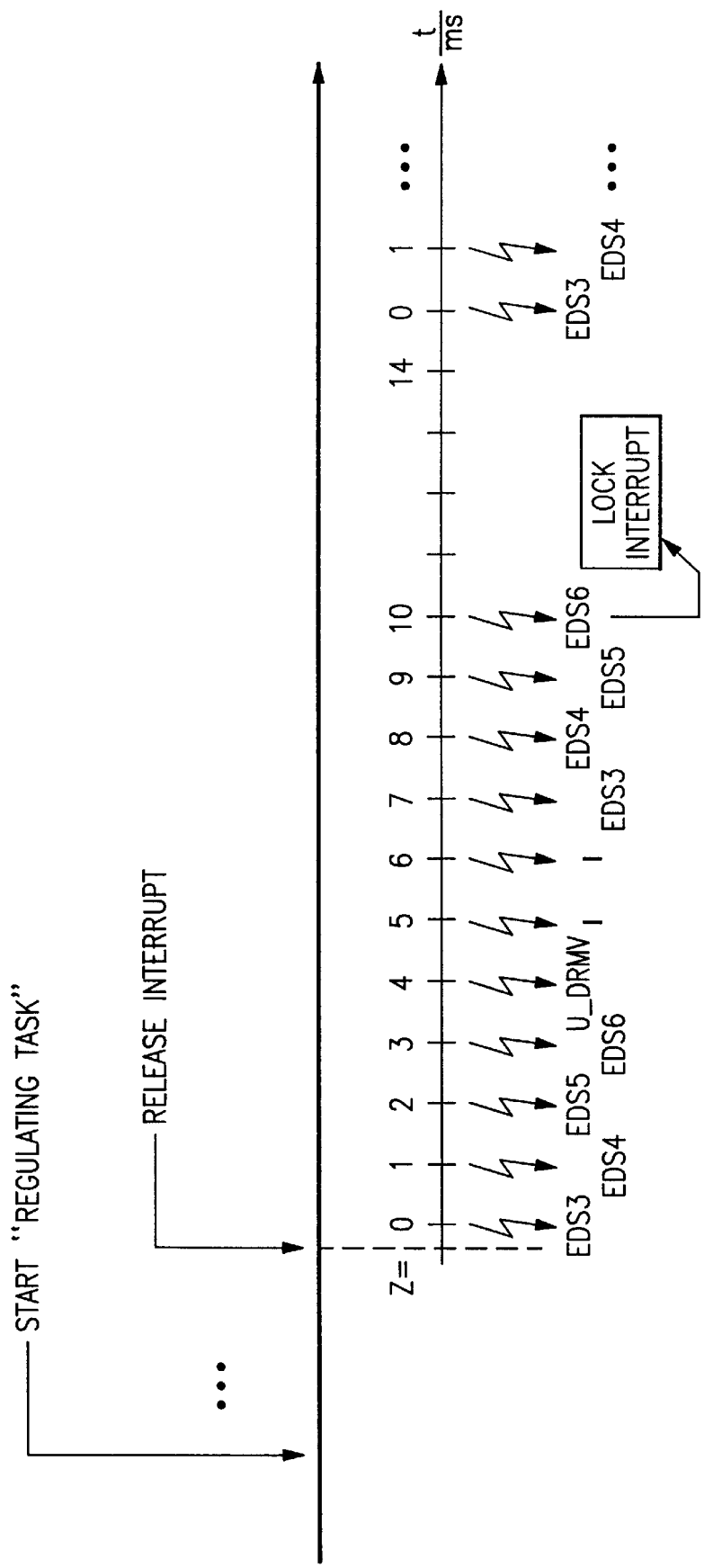
FIG. 4 is a phase diagram for a program flow in a static state.

FIG. 4 shows a time diagram for a program flow of a static state. By static state it is meant that the current reference value i_Ref(t) is constant. The course of the program begins with the start of a regulating task and an release of the interrupt. At the Z=0 moment the program begins to level the first electromagnetic pressure regulator, here designated as EDS 3, that is, a reference/actual comparison is carried out. The duration for this regulation procedure usually amounts to <0.1 ms. At the Z=1 moment, that is, 1 ms later, the leveling also begins for a regulator EDS 4. At the Z=4 moment all electromagnetic pressure regulators have been leveled. Between the Z=4 and Z=7 moments there is a pause during which the program can perform another task such as the definition of a driving activity. At the Z=7 moment a reference/actual comparison is, in turn, carried out for the electromagnetic pressure regulator EDS 3. At the Z=8 moment the leveling for the second electromagnetic pressure regulator begins, etc. At the Z=14 moment each electromagnetic pressure regulator has been thus twice leveled. The regulation task terminates here.

Figure 5:
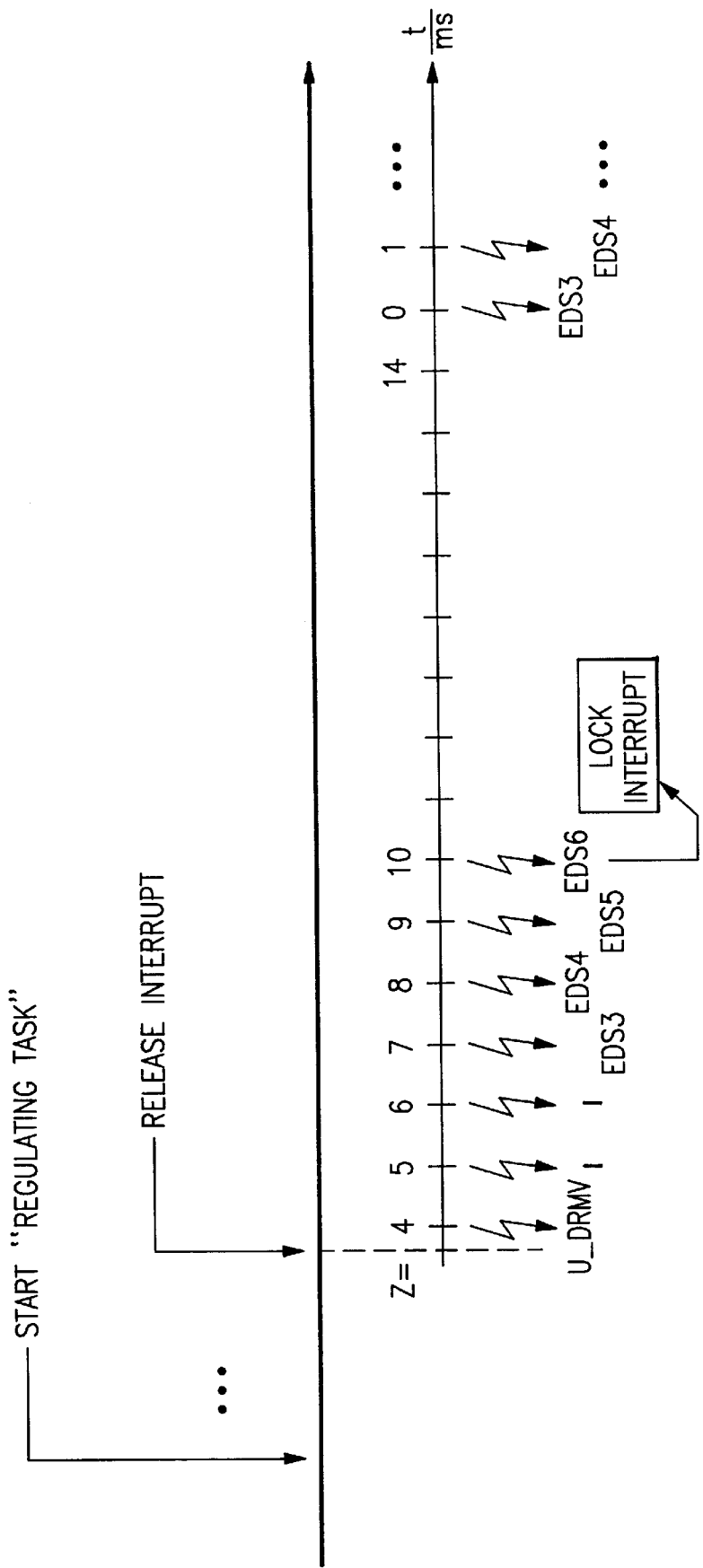
FIG. 5 is a time diagram for a program flow in a dynamic state.

FIG. 5 shows a time diagram for the program flow in a dynamic state. By dynamic state it is meant that the current reference i_Ref(t) changes. The program flow begins with the start of the regulating task and of the release of the interrupt at the Z=4 moment. "Release of the interrupt" means that the normal program flow is interrupted by the microcontroller and the regulating task for current control is executed. From the moments Z=4 to Z=7 the leveling of the first electromagnetic pressure regulator begins, here EDS 3. At the Z=10 moment the last electromagnetic pressure regulator, here EDS 6, is leveled. Thereafter the interrupt is locked, that is, the microcontroller continues with its normal program flow. At the Z=14 moment, the program flow has run its course and the regulation task is terminated.

| Reference numerals |
| --- |
| 1 electronic control device |
| 2 regulator |
| 3 end stage |
| 4 electromagnetic pressure regulator |
| 5 precision resistor |
| 6 amplifier |
| 7 A/D converter |
| 8 signal course |
| 9 signal course |
| 10 transients |
| 11 memory |
| 12 first function block |
| 13 second function block |
| 14 summation point |
| 15 summation point |
| 16 summation point |
| 17 pilot control block |
| K1 first correction factor |
| K2 second correction factor |

What is claimed is:

1. A process for current control of an inductive load of an electrohydraulic pressure regulator in an automatic transmission of a motor vehicle, the process comprising the steps of:

connecting a precision resistor (5) in series to the inductive load and electrically coupling the A/D converter (7) to the precision resistor (5);

periodically measuring a voltage drop experienced across the precision resistor (5) and supplying the measured voltage drop to the A/D converter (7) where the measured voltage drop is converted to a current actual value (i_act(t));

summing the current actual value (i_act(t)), outputted by the A/D converter (7), with a supplied current reference value (i_ref(t)) to generate a combined error signal, and inputting the error signal to a clock controlled regulator (2);

generating from the inputted error signal, via the clock controlled regulator (2), a regulating output signal (PWM_regulator) for controlling a flow of current through the inductive load;

synchronizing a time when the voltage across the precision resistor (5) is periodically measured by delaying an inquiry cycle of the AND converter (7) by a presettable time (dt) related to a cycle of the output signal (PWM_regulator); and generating a pilot control second signal (S2), in a case of a substantial change in the current reference value (i_ref(t)), and combining the pilot control second signal (S2) together with the output signal (PWM_regulator), generated by the clock controlled regulator (2), for controlling a flow of current through the inductive load.

2. The process for current control of an inductive load according to claim 1, wherein the step of generating the pilot control second signal (S2) further comprises the steps of:

using a pilot control block (17) and forming the pilot control block (17) with a memory (11), a first function block (12), and a second function block (13); and receiving, as input signals to the pilot control block (17), a current control value (i_control(t)) and the output signal (PWM_regulator) of the regulator (2).

3. The process for current control of an inductive load according to claim 2, wherein the step of generating the second signal (S2) further comprises the steps of:

generating, at a previous point in time, a third signal (S3) from the current control value (i_control(t)) and a current control value (i_control(t−1); and summing the third signal (S3) and a first correction factor (K1), via the first function block (12).

4. The process for current control of an inductive load according to claim 3, further comprising the step generating the first correction factor (K1) from the actual current control value (i_control(t)) and the output signal (PWM_regulator) of the clock controlled regulator (2).

5. The process for current control of an inductive load according to claim 4, further comprising the step of incorporating a second correction factor (K2), into the second signal (S2), to facilitate taking into account at least one of a fluctuation in a supply voltage and a reciprocal interference of the inductive load.

6. The process for current control of an inductive load according to claim 1, further comprising the step of reducing a dynamic of the clocked controlled regulator (2), when the pilot control signal (S2) is utilized, by temporarily interrupting the periodically measuring of the voltage drop of the precision resistor (5) to prevent overshoot of the regulating output signal.

* * * * *